United States Patent
Sasaki et al.

[11] Patent Number: 6,003,380
[45] Date of Patent: Dec. 21, 1999

[54] STRAIN GAGE PRESSURE SENSOR WHEREIN A GAP IS MAINTAINED BETWEEN THE DIAPHRAGM AND THE SUBSTRATE

[75] Inventors: Keiji Sasaki; Koichi Otani; Yukio Koganei, all of Tokyo, Japan

[73] Assignee: Fujikoki Corporation, Tokyo, Japan

[21] Appl. No.: 08/927,269

[22] Filed: Sep. 11, 1997

[51] Int. Cl.$^6$ .................................................. G01L 9/04
[52] U.S. Cl. .................................................. 73/720
[58] Field of Search ............................ 73/720, 721, 726, 73/737, 753, 754, 718, 724; 257/254, 419; 338/2, 4

[56] References Cited

U.S. PATENT DOCUMENTS

| | | | |
|---|---|---|---|
| 3,078,431 | 2/1963 | Denyssen | 338/2 |
| 4,079,508 | 5/1978 | Nunn | 29/431 |
| 4,086,554 | 4/1978 | Sieder | 338/2 |
| 4,311,980 | 1/1982 | Prudenziati | 338/2 |
| 4,399,707 | 8/1983 | Wamstad | 73/727 |
| 4,481,497 | 11/1984 | Kurtz et al. | 338/2 |
| 4,617,607 | 10/1986 | Park et al. | 73/724 |
| 4,766,666 | 8/1988 | Sugiyama et al. | 73/721 |
| 4,993,267 | 2/1991 | Allard et al. | 73/726 |
| 5,209,122 | 5/1993 | Matly et al. | 73/727 |
| 5,224,384 | 7/1993 | Kremidas et al. | 73/721 |
| 5,227,760 | 7/1993 | Kobayashi | 338/2 |
| 5,242,863 | 9/1993 | Xiang-Zheng et al. | 257/419 |
| 5,349,865 | 9/1994 | Kavli | 73/724 |
| 5,349,867 | 9/1994 | Park | 73/727 |
| 5,481,905 | 1/1996 | Pratt | 73/115 |

FOREIGN PATENT DOCUMENTS

| | | |
|---|---|---|
| 0 762 096 | 3/1997 | European Pat. Off. . |
| 62-12458 | 3/1987 | Japan . |

Primary Examiner—William Oen
Attorney, Agent, or Firm—Foley & Lardner

[57] ABSTRACT

A pressure sensor prevents the occurrence of a large deformation or breakage of the diaphragm in a strain gage-type pressure sensor utilizing a thin plate-shaped insulating body as the diaphragm. The pressure sensor comprises an insulating diaphragm having a strain gage on its surface and a substrate positioned opposing the surface of the diaphragm on which the strain gage is mounted and kept a predetermined distance away from the surface. The diaphragm can be formed of material such as ceramic of alumina, zirconia or the like, silicon or crystal. The substrate can be formed of either the same material as the diaphragm, or the surface opposing the diaphragm can be formed of an insulator disposed on metal. The diaphragm and the substrate can be affixed using a low-melting glass.

33 Claims, 10 Drawing Sheets

STRAIN GAGE PRESSURE SENSOR WHEREIN A GAP IS MAINTAINED BETWEEN THE DIAPHRAGM AND THE SUBSTRATE

TECHNICAL FIELD OF THE INVENTION

The present invention relates to pressure sensors comprising a strain gage mounted on a substrate having flexibility and, more particularly, to pressure sensors utilizing ceramic as the flexible substrate.

BACKGROUND OF THE INVENTION

The pressure sensor of the prior art utilizing a strain gage is formed by providing an insulator of polyimide and the like on a metallic diaphragm and forming a strain gage by evaporation on top, or by adhering an already-formed strain gage on a metallic diaphragm by an adhesive and the like.

The pressure sensor utilizing such a strain gage has an advantage that the output linearity is well and the structure of the electric circuit is relatively simple. However, the characteristics of the metallic diaphragm, for example, the flexural strength, the deformation hysteresis by the change in pressurization, and the permanent deformation by heat expansion and stress caused deterioration of accuracy and durability of the sensor.

Figure 10:
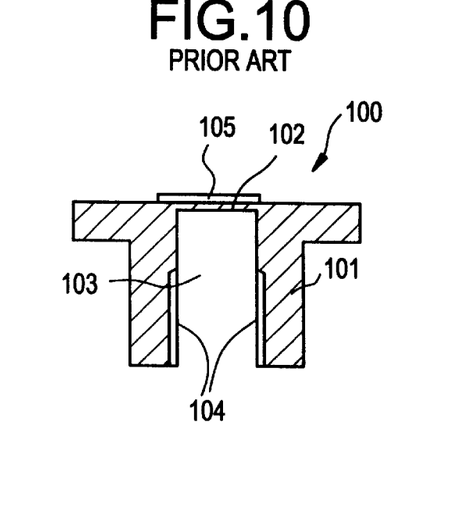
FIG. 10 is a cross-sectional view showing the structure of the pressure sensor of the prior art.

Especially, as shown in FIG. 10, in a pressure sensor formed by cutting out from a metal block a clamp member 101, a diaphragm portion 102 and a pressure opening 103 having a screw portion 104 on the inner wall thereof for fixing a piping, further having a strain gage 105 formed on top of the diaphragm 102, the clamp member 101 and the diaphragm 102 are formed solidly, so strain will occur in the diaphragm 102 when being clamped by too much torque, resulting in unnecessary change in output.

Further, in order to detect the accurate pressure, there was a need to utilize dielectric pressure, since there was only a very thin insulating body between the metallic diaphragm and the strain gage.

In such a case, there was a need to put an insulating body between the metallic diaphragm and the strain gage, but this insulating body causes a drift phenomenon wherein the output characters will change by cause of change in contact between the diaphragm by temperature, and the deformation by the repeated displacement of the diaphragm.

Further, according to the structure of the strain gage, the permanent deformation or the breakage of the diaphragm may happen when too much stress is loaded to the diaphragm. The breakage of the diaphragm may cause serious damage like the emission of pressure medium.

On the other hand, a capacitance-operated pressure sensor is known as the pressure sensor utilizing insulators such as ceramic and the like to the diaphragm. These kind of pressure sensors are advantageous in that very high durability and repeatability of the measurement could be gained because of the characteristics of the material being used.

However, these type of pressure sensors have problems such as the method of detecting the change in distance between the electrodes by the capacitance being inferior to the potential linearity of output, the electric circuit being very complicated, the floating capacity being unstable, the manufacturing of ceramic elements of the sensing unit needing high accuracy, and so on.

Still further, a pressure sensor gained by forming and baking a thick-film resistor in a bridge state on a diaphragm formed of a ceramic plate by a screen print is known, as is disclosed in Japanese Patent Publication No. S62-12458. This pressure sensor will not be influenced by the capacity, but when the impressed pressure rises above a certain level, it will cause permanent deformation to the diaphragm, or even worse, break the diaphragm.

The object of the present invention, based on the problems mentioned above, is to provide a strain gage-type pressure sensor utilizing insulating thin plate of ceramic materials such as alumina and zirconia, silicon or crystal and the like, wherein too much deformation or breakage of the diaphragm is prevented.

Further, the present invention is aimed at providing a pressure sensor with high accuracy and high repeatability.

SUMMARY OF THE INVENTION

In order to solve the above problem, the present invention provides a pressure sensor comprising an insulated diaphragm having a strain gage formed on the surface thereof, and a substrate positioned opposing the surface of the diaphragm mounting the strain gage and whose bottom surface is positioned so as to keep a predetermined distance from said surface mounting the strain gage, wherein an insulator formed of ceramic materials such as alumina and zirconia, silicon or crystal, and utilizing the same material as the diaphragm as the substrate or metal having the surface opposing the diaphragm insulation-processed.

Further, the diaphragm and the substrate are fixed together by an adhesive made of low-melting glass or thermosetting resin.

Further, a predetermined gap is formed by mixing in a gap forming member having a predetermined diameter to the adhesive, or by forming a concave on the bottom surface of the substrate.

The present invention provides a pressure sensor comprising an insulated diaphragm having a strain gage formed on the surface thereof, and a substrate positioned opposing the surface of the diaphragm mounting the strain gage and whose bottom surface is positioned so as to keep a predetermined distance from said surface mounting the strain gage, wherein an electric circuit wiring pattern is formed on the surface of said substrate, or an electric circuit wiring pattern formed on a circuit board is mounted on said substrate.

The present invention further provides a pressure sensor comprising an insulated diaphragm having a strain gage formed on the surface thereof, and a substrate positioned opposing the surface of the diaphragm mounting the strain gage and whose bottom surface is positioned so as to keep a predetermined distance from said surface mounting the strain gage, wherein a pressure sensor mounting an electric circuit is fixed via an elastic member to a container on the surface of said substrate.

DETAILED DESCRIPTION

Figure 1:
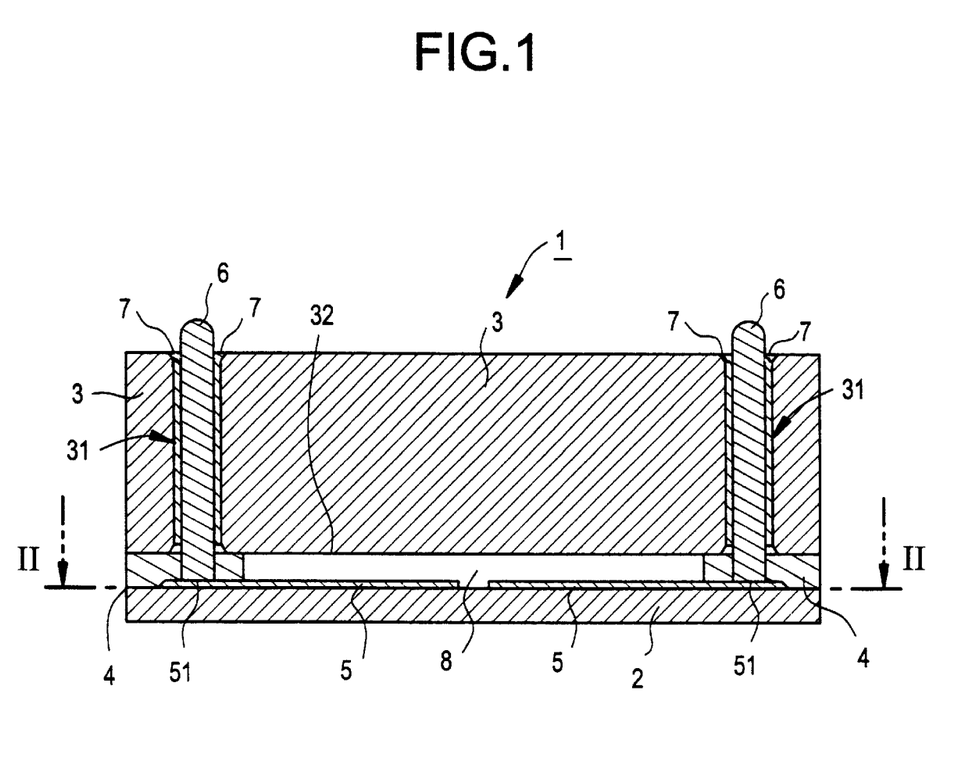
FIG. 1 is a vertical cross-sectional view showing the structure of the pressure sensor of the present invention.
Figure 2:
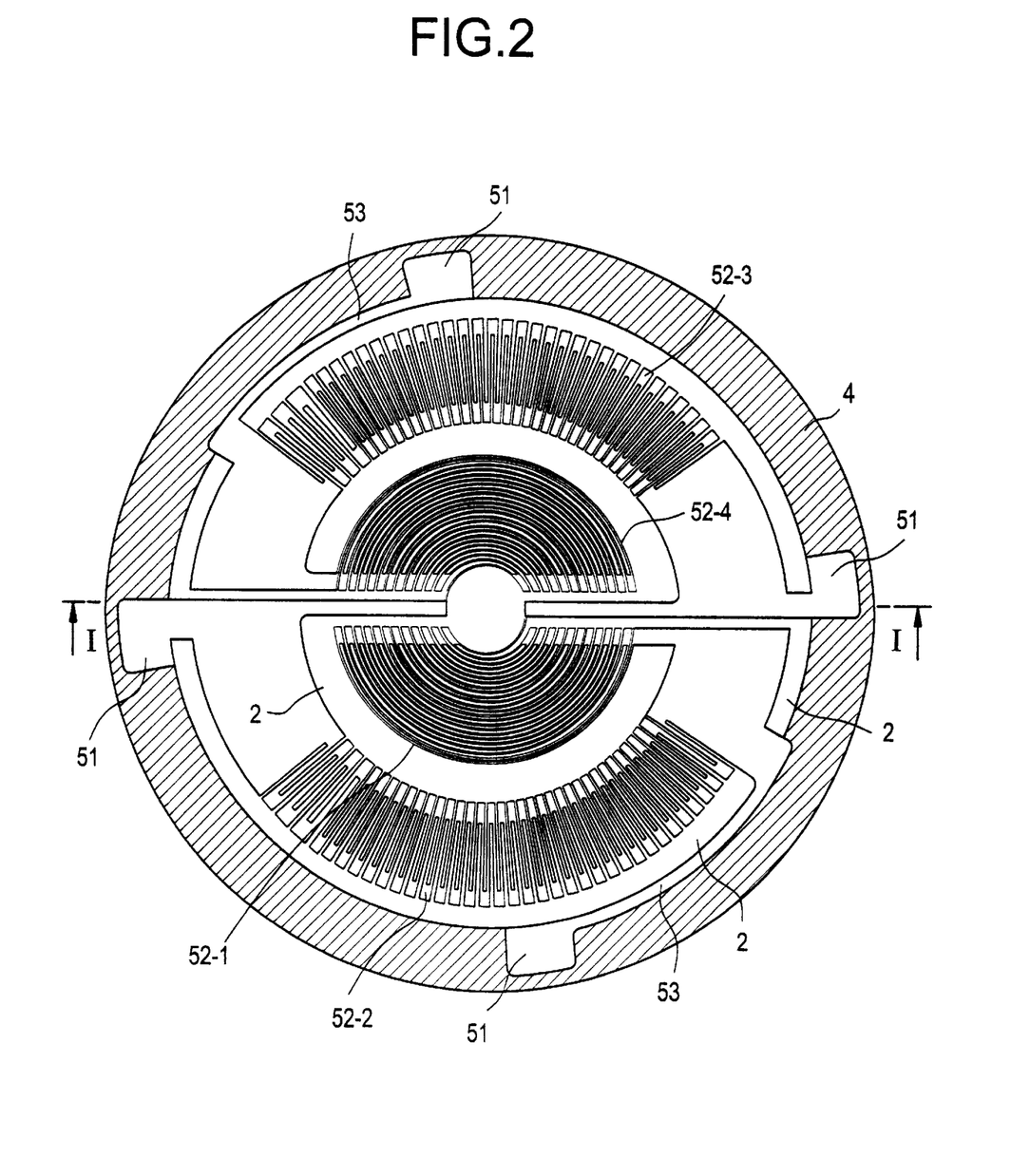
FIG. 2 is a horizontal cross-sectional view taken at line A—A of FIG. 1.

The structure of the strain gage pressure sensor according to the present invention will be explained with reference to FIGS. 1 and 2. FIG. 1 is a vertical cross-sectional view explaining the structure of the pressure sensor taken at line B—B of FIG. 2. FIG. 2 is a horizontal cross-sectional view taken at line A—A of FIG. 1.

The strain gage pressure sensor 1 of the present invention structured by layering a insulated diaphragm 2 forming a strain gage comprising a resistor 5 on its surface and a insulated substrate 3 with an adhesive having a predetermined thickness.

Electrode pads 51, resistors 52-1 through 52-4 and a lead wire 53 for connecting the resistors and the electrode pads are formed on the surface of the diaphragm by screen printing and the like.

Resistors 52-1 through 52-4 are connected in a bridge to form a strain gage, and each connection point for connecting the resistors 52 are connected through a lead wire 53 to the electrode pads 51 for taking out the electric output.

The insulated diaphragm 2 is composed of a ceramic thin plate made of alumina ($Al_2O_3$), for example, formed in a circular shape having a diameter of approximately 21 mm and a thickness of 0.2–2.0 mm. A strain gage is formed on the surface of the diaphragm by a conventional method, for example, positioning a resistor 5 in a bridge state by a screen print.

The mechanical deformation of the diaphragm occurring by the impression of stress such as pressure changes the resist value of the resistor 52 forming the strain gage, and converts to a change in electric output of the bridge.

This print pattern could print four resistors uniformly by controlling the layer thickness in μm units. Therefore, a bridge circuit is formed without having to provide adjustment of laser trimming and the like, and output voltage proportional to the pressure being added to the diaphragm could be gained.

Further, when layer thickness printing is not utilized, the bridge resistance is adjusted by laser trimming.

An insulator such as ceramic material of alumina or zirconia, a silicon (Si) or crystal could be used as the diaphragm 2.

Of the above materials, the ceramic of alumina is advantageous because the mechanical characteristics as an elastic body are very good, and it is handy, cost effective and high performance. The ceramic of zirconia is suitable for use under high pressure because the flexural strength, the pressure resistance and the stress characteristics when pressure is added thereto enables the allowable stress of the diaphragm to be set at a high standard.

The substrate 3 is formed of a ceramic of alumina and the like having a thickness of 4 mm and shaped the same as the diaphragm. A terminal hole 31 penetrating the substrate in the vertical direction is positioned on the substrate 3 opposing said electrode pad 51, with a terminal 6 inserted thereto and a conductive paste 7 being filled between the terminal hole 31 and the terminal 6.

Countersinking is performed to the upper portion of the terminal hole 31 so that the terminal 6 and the conductive paste 7 are easily inserted.

The lower end of the terminal 6 penetrates the adhesive 4 layer and contacts the electrode pad 51, and is bonded thereto by a conductive paste 7 with low resistance value.

When the lower end of the terminal hole 31 formed on the substrate 3 is right-angled, there is a possibility that the conductive paste 7 supplied inside this hole may not sufficiently fill the space formed in the adhesive layer 4. This may lead to undesirable reduction of the resistance value of the terminal 6. In order to cope with this problem, a taper is formed by countersinking or the like at the lower end of the terminal hole 31 formed on the substrate 3, so that the flow-in of the conductive adhesive is easily performed, and sufficient filling of space formed in the adhesive layer 4 could be accomplished. Thus, the reliability of the connection between the terminal 6 and the electrode pad 51 is improved.

Further, the electrode pads 51 and the lead wire 53 are positioned so as to be covered by the adhesive 4 where diaphragm 2 will not deform, preventing the transmission of the deformation of diaphragm 2 to the terminal 6.

The bottom surface 32 of the substrate 3 works as a limiting member (mechanical stop) for preventing the deformation of the diaphragm 2 to be passed the height of the gap 8. Even when pressure is added thereto by the lower surface of the diaphragm 2, the bottom surface 32 prevents too much deformation of the diaphragm, which leads to prevention of the breakage of the diaphragm 2.

The same material constituting the diaphragm 2, that is, insulators such as ceramic (sinter) of alumina or zirconia, silicon (Si), crystal and the like, is desirably used as the material of substrate 3, by means of thermal expansion coefficient. Further, by insulating the surface opposing the diaphragm, short circuit will not occur to the bridge circuit when being contacted by the diaphragm, and metal could be utilized as the substrate.

The adhesive 4, utilizing low-melting glass for example as its material, adheres the substrate 3 and the diaphragm 2 so as to form a gap of about 50 μm.

By sealing the strain gage by the diaphragm 2, the substrate 3 and the adhesive 4, the strain gage which is weak to humidity and ambient gas could be protected.

Low-melting glass has good elastic characteristics and its thermal expansion rate is almost the same as ceramic (thermal expansion coefficient: alumina=$7.1 \times 1/10^6$, low-melting glass=5 to $7 \times \frac{1}{10}^{6}$), so concentration of the stress to the adhered portion is prevented.

Other than low-melting glass, when the melting temperature of the low-melting glass gives bad influence to the strain gage, thermosetting adhesive (lowest setting temperature 90° C.) could also be utilized as the adhesive.

The output signal of the strain gage is taken out from terminal 6, and necessary electric output is gained by an electric circuit not shown in the drawing.

(Embodiment 1)

Figure 3:
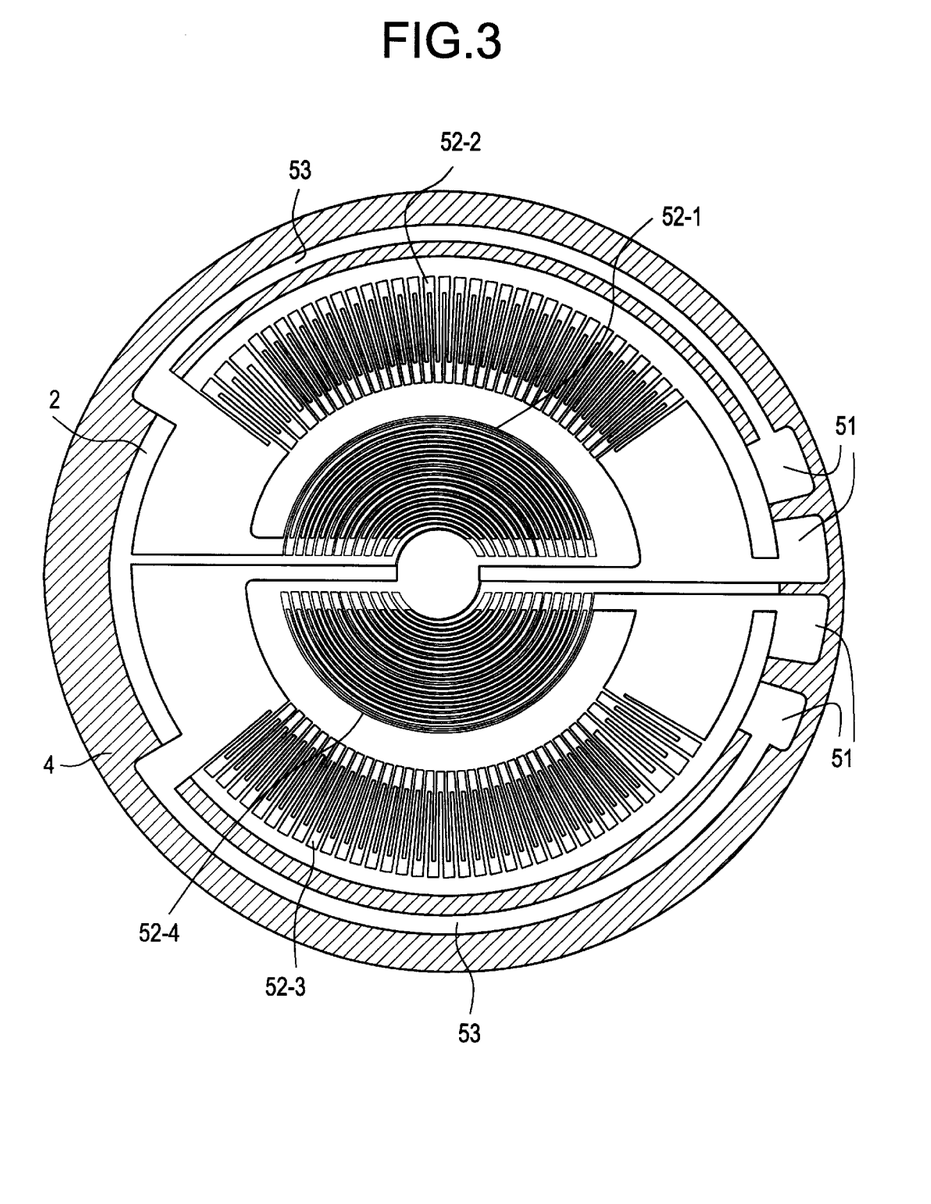
FIG. 3 is a horizontal cross-sectional view showing another arrangement of the electrode pads.

FIG. 3 shows another example of the strain gage pattern on a diaphragm.

This embodiment is characterized in that the electrode pads 51 are gathered. That is, the electrode pads 51 are gathered to one portion of the diaphragm 2, and the connection of the resistors 52 positioned at the other ends of the diaphragm are connected by lead wires 53 to the electrode pads 51 for taking out the electric output.

(Embodiment 2)

Figure 4:
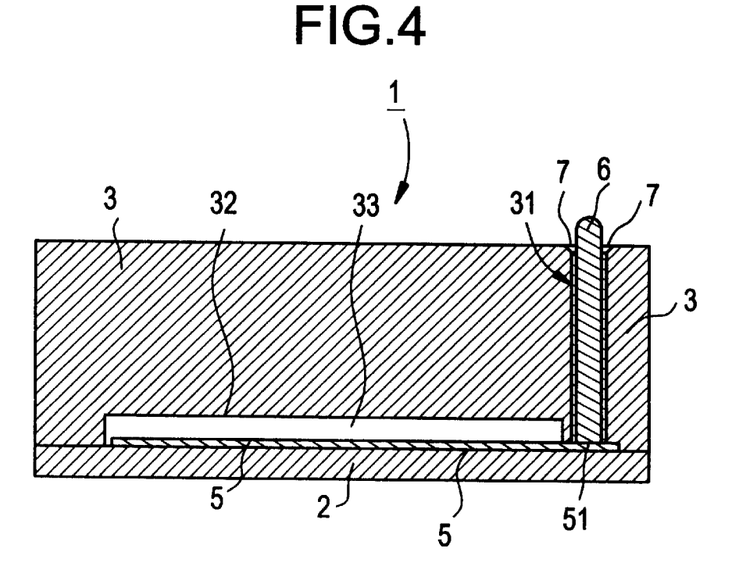
FIG. 4 is a vertical cross-sectional view showing another arrangement of the terminal.

FIG. 4 shows another embodiment of the strain gage-type pressure sensor 1 of the present invention. The strain gage-type pressure sensor 1 of the present invention is formed by layering and directly connecting an insulated diaphragm 2 having a strain gage formed of a resistor 5 on its surface and an insulated substrate 3.

The diaphragm 2 and the substrate 3 is connected, for example, by applying and baking low-melting glass paste.

The diaphragm 2 of the present embodiment utilizes the diaphragm shown in FIG. 3. Electrode pads 51, resistors 52 and lead wires 53 for connecting the resistors and the electrode pads are formed on the surface of the diaphragm 2 by sputtering, for example.

The substrate 3 is formed of ceramic of alumina and the like having the same shape as the diaphragm, and a concave 33 having a predetermined depth is formed on the lower surface 32 of the substrate 3.

According to the present embodiment, the depth of the concave 33 determines the size of deformation of the diaphragm. Therefore, the work of the mechanical stop may be set in high accuracy.

(Embodiment 3)

Figure 5:
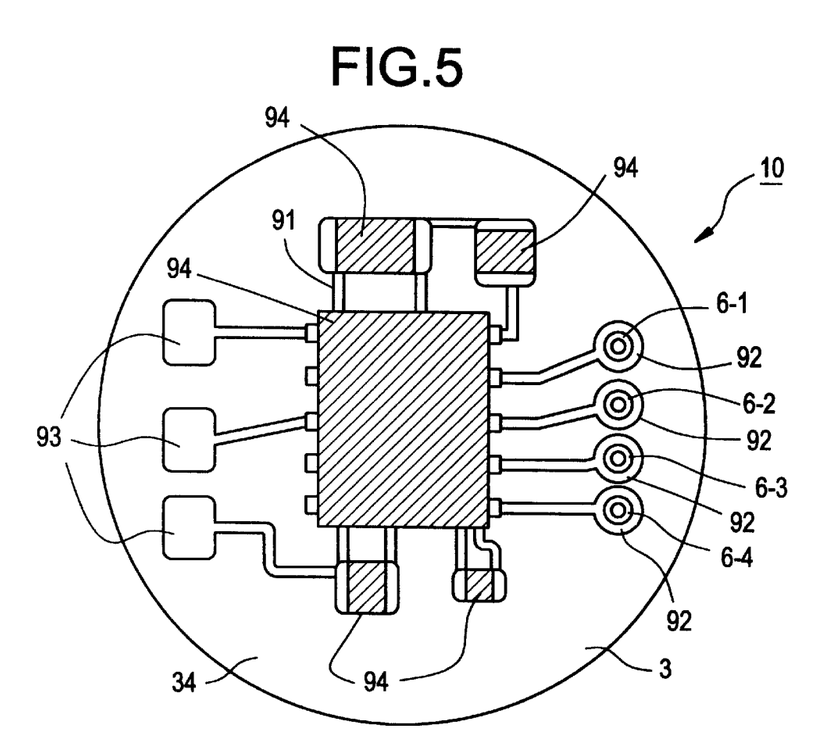
FIG. 5 is a plan view explaining the concept of the structure of the pressure sensor of the present invention.
Figure 6:
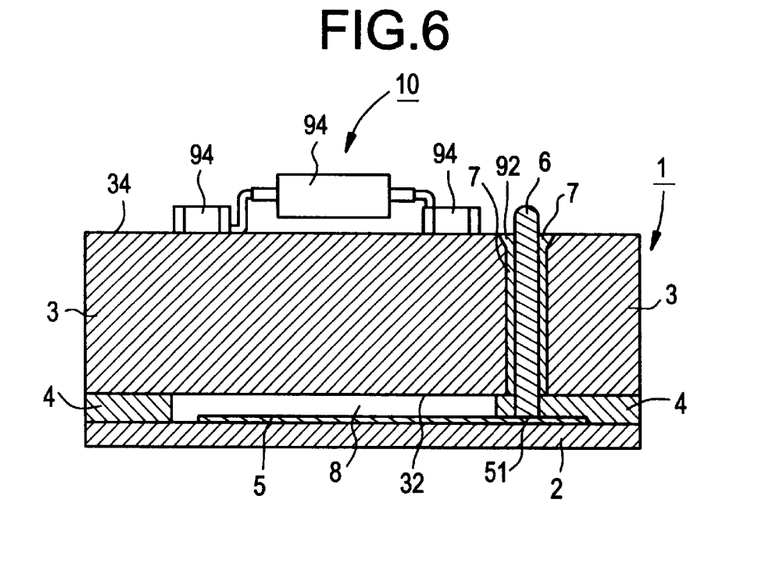
FIG. 6 is a vertical cross-sectional view showing the pressure sensor of FIG. 5.

FIG. 5 and FIG. 6 are utilized to explain one embodiment of the structure of a strain gage-type pressure sensor utilizing the above described strain gage-type pressure sensor. FIG. 5 is an upper view of the strain gage-type pressure sensor, and FIG. 6 is the partial cross-sectional side view of the same.

The pressure sensor 10 is characterized in that a wiring pattern for electric circuit is directly mounted on a bottom surface 32 of an insulated substrate 4 opposing the diaphragm 2 and on an opposite surface 34, and various circuit elements are positioned and fixed thereto.

The wiring pattern 9 formed on the substrate 3 is formed of a wiring 91 positioned to form a determined shape, a plurality of terminal pads 92 mounted on a countersinking portion mounted on the upper portion of a terminal hole 31 of the substrate, a plurality of electrode pads 93 for power source and signal takeout, and a plurality of circuit elements 94 which are condensers, resistors and ICs soldered to the wiring 91. The terminal pads 92 and the terminals 6 are connected electrically by a conductive paste 7 and the like.

The substrate for mounting the electric circuit may strain by temperature and humidity and can be a cause of a wrong output voltage. Therefore, a ceramic substrate is preferred.

However, ceramic substrates are expensive compared to glass epoxy resin substrate. In the present embodiment, the substrate 3 is formed by ceramic, so the substrate 3 itself is used as the substrate for the electric circuit.

By such structure, the electric circuit can be mounted directly on the insulated substrate 3, and the elements comprising the pressure sensor could be reduced.

(Embodiment 4)

Figure 7:
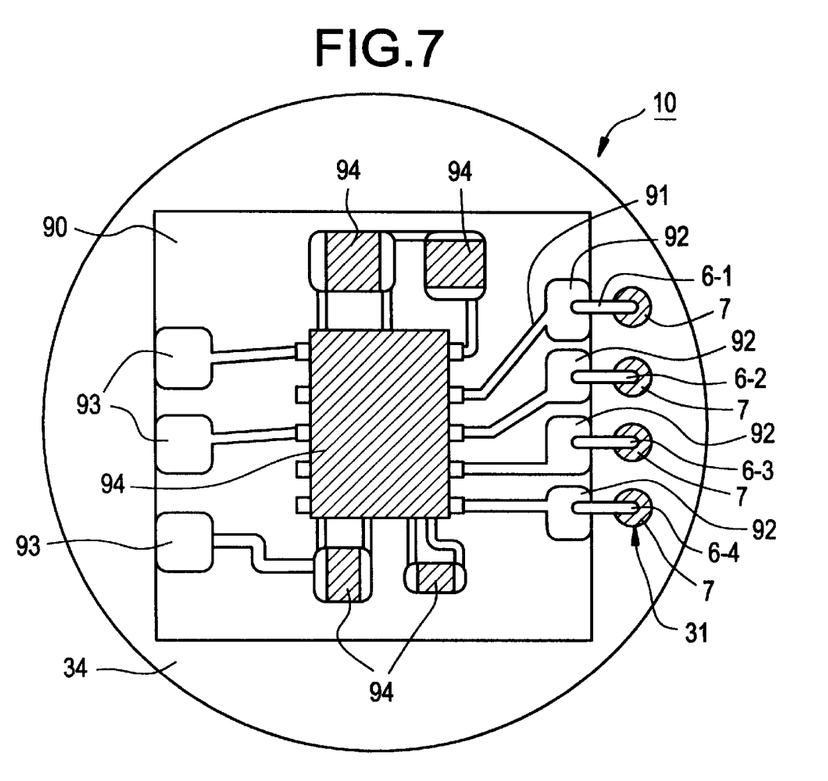
FIG. 7 is a plan view explaining the concept of another structure of the pressure sensor of the present invention.
Figure 8:
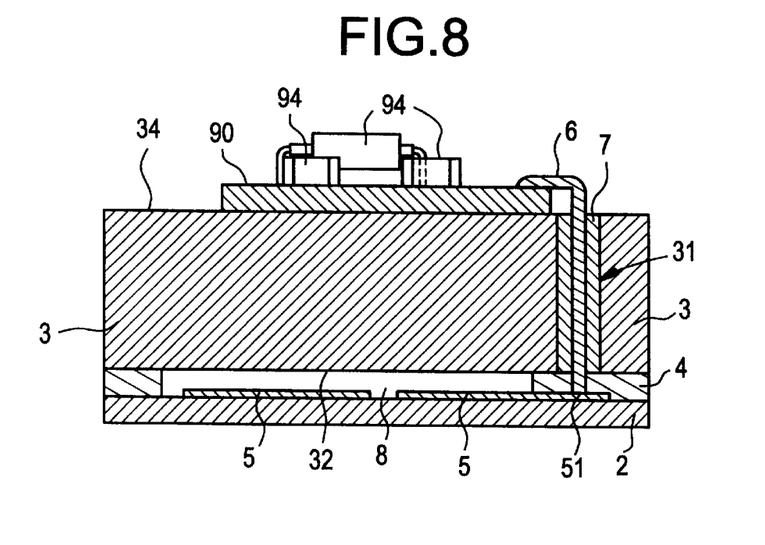
FIG. 8 is a vertical cross-sectional view of the pressure sensor shown in FIG. 7.

FIG. 7 and FIG. 8 are utilized to explain a structure of another embodiment of a strain gage-type pressure sensor utilizing the strain gage-type pressure sensor described above. FIG. 7 is an upper view of the strain gage-type pressure sensor, and FIG. 8 is a partial cross-sectional side view of the same.

The pressure sensor 10 is characterized in that a circuit board 90 having a circuit board wiring pattern formed thereto is fixed to a bottom surface 32 opposing the diaphragm 2 and an opposite surface 34 of the insulated substrate 4 by an adhesive or the like, having various circuit elements positioned and fixed thereto.

The wiring pattern 9 mounted on the circuit board 90 made of ceramic and the like comprises a wiring 91 positioned to form a predetermined shape, a plurality of terminal pads 92 mounted on a countersinking portion mounted on the upper portion of a terminal hole 31 of the substrate 3, a plurality of electrode pads 93 for power source and signal takeout, and a plurality of circuit elements 94 which are condensers, resistors and ICs soldered to the wiring 91. The terminal 6 penetrating through the substrate 43 is bent and soldered to the terminal pad 92 and connected electrically thereto.

By positioning the electric circuit on the insulated circuit board 90 and adhering it on the insulated substrate 3, the circuit could be changed easily, and the pressure sensor could correspond to the change in specification immediately.

(Embodiment 5)

Figure 9:
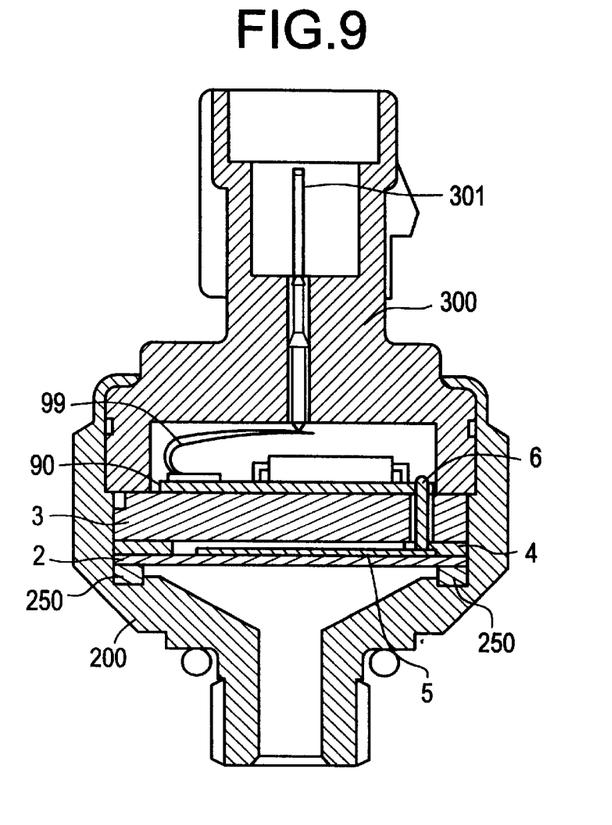
FIG. 9 is an assemble cross-sectional view showing the structure of the pressure sensor of the present invention.

FIG. 9 is an explanatory view of the structure of the pressure sensor assembly utilizing the pressure sensor of the present invention.

The assembly is structured to store the pressure sensor 10 having a circuit board 90 adhered to its upper surface inside a metal container 200 and a resin container 300.

The pressure sensor 10 comprises a structure which is almost the same as the pressure sensor shown in FIGS. 7 and 8. The pressure sensor 10 is set on a shoulder portion mounted inside a lower metal container 200 having a through hole via an elastic packing 250, and is accommodated and fixed to an area formed by the lower metal container 200 and the upper resin container 300 having a terminal 301.

The wall of the area close to the upper end opening of the lower metal container 200 is formed to be thin, and the thin wall portion is caulked to fix a shoulder portion of the upper resin container 300 inserted to said opening. The electrode pads mounted on the electric circuit board 90 and the terminal 301 formed on said upper container are connected by a flexible board 99 which takes out the electric signals.

As is explained above, the present embodiment supports the diaphragm 2 by a sealing member (packing) 250 made of rubber formed around the pressure receiving surface of the diaphragm, so the deformation by the pressure will not be transmitted to the terminal 6, which enables accurate transmission and measurement of the stress.

The seal of the pressure medium is performed by rubber material (packing) and the like, but the material could be changed to whatever suited to the medium.

The pressure sensor of the present invention can measure the pressure of 30 to a few hundred Kgf/cm$^2$ by forming the diaphragm to a thickness of about 0.2 to 2.0 mm. In fact, the strain occurring to a diaphragm with a thickness of about 0.7 mm is about 8 $\mu$m in the center, so an electric output of about 8 mV could be taken out.

Further, the pressure correspondence range, when the maximum displacement is 5.3 $\mu$m when pressurized, will measure a fine pressure of 0.5 kgf/cm$^2$ when the thickness of the diaphragm 2 is 0.2 mm, and a high pressure of 200 kgf/cm$^2$ when the thickness of the diaphragm 2 is 1.5 mm.

(Embodiment 6)

Figure 11:
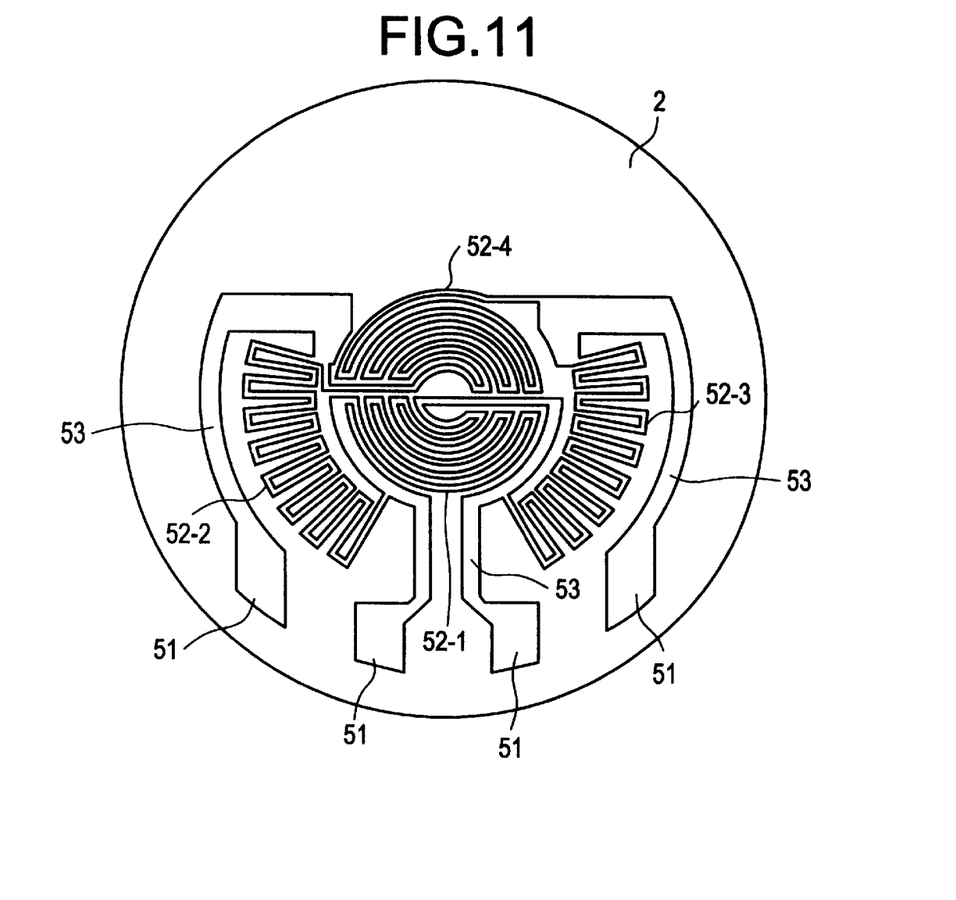
FIG. 11 is a plan view explaining the shape of the resistor body of the pressure sensor of FIG. 7.

In the above embodiment, resistors 52-1 through 524 formed on the surface of the diaphragm 2 include a return portion in the right angle as is shown in FIG. 11. Therefore, a phenomenon similar to the mechanism of the occurrence of a micro-crack from the interior angle of the return portion when adjusting the resistance value by laser trimming may occur when used for a long time under repeated pressure by the occurrence of a micro-crack to the resistor 52 from the interior angle of the return portion because of a concentration of the stress to said portion. This may lead to error of the detected value of the resistor gage.

Further, the portion forming an inner arc of the resistor 52, for example, resistor gages 52-2 and 52-3, positioned in the form of an arc have decreased dielectric strength between the neighbor resistors because the resistors are placed close to each other. At the same time, a short circuit between the resistors may occur at the time of manufacture or during use, and there is limit to making a more fine pattern on the resistors 52.

Figure 12:
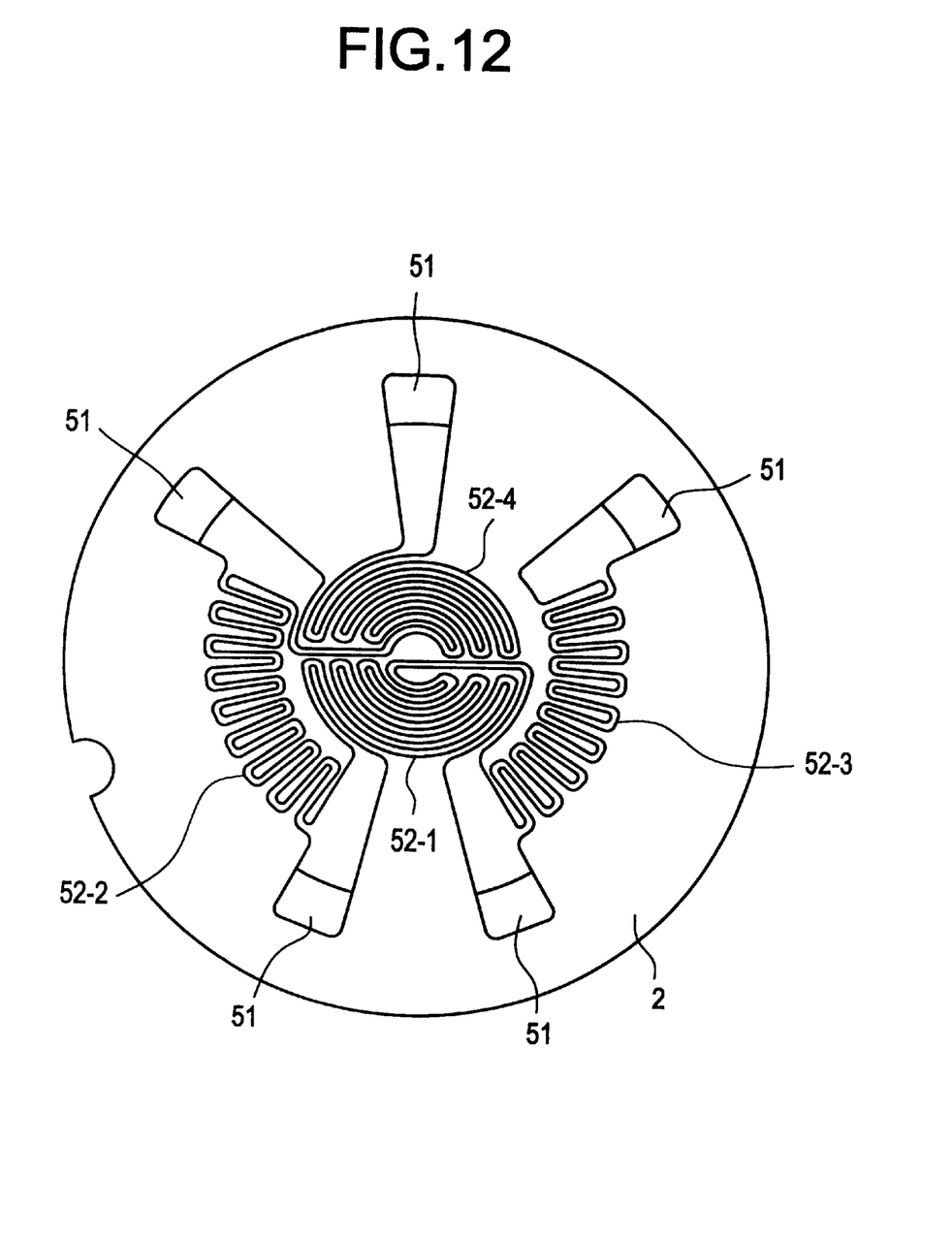
FIG. 12 is a plan view showing the structure of embodiment 6 of the pressure sensor according to the present invention.

The present embodiment solves the above-mentioned problems. As is shown in FIG. 12, the resistors 52-1 through 52-4 formed on the surface of the diaphragm 2 have no angle of the return portions and bend portions to form a circle so that no micro crack will occur from the interior angle of the return portion toward the resistors 52, and at the same time improve the dielectric strength between the resistors by opening the distance between the resistors, enabling a more fine pattern of the resistors 52.

(Embodiment 7)

The present embodiment solves the above-mentioned problem by another structure.

Figure 13A:
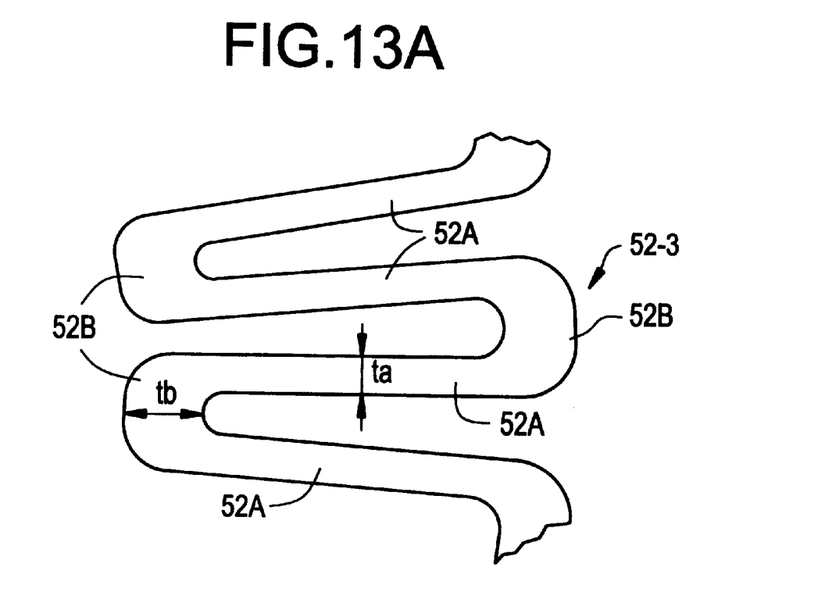
FIG. 13 is a plan view showing the structure of embodiment 7 of the pressure sensor according to the present invention.
Figure 13B:
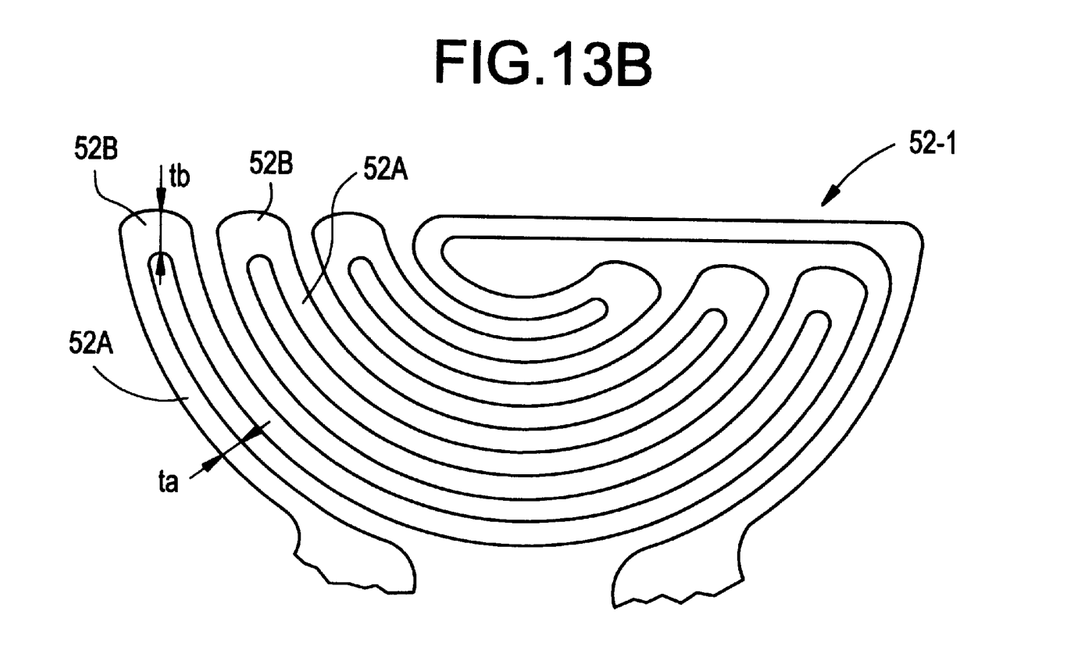

That is, in this embodiment, the width tb of the return portion 52B of the resistors 52-1 through 52-4 is larger than the width ta of the resistor gage portion 52A, as is shown in FIG. 13, so that the resistance value of the return portion 52B is small and the function as the gage portion is reduced.

By such structure, even when micro crack occurs from the interior angle of the return portion toward the resistors 52, the change of the resistance value of the return portion 52B will not effect the measured value, and thus the effect of the occurrence of a micro crack to the measured value will decrease.

The structure of the present embodiment can not only be applied to the outside gage portions 52-2 and 52-3 of FIGS. 11 and 12 as is shown in FIG. 13 (A), but also to interior gage portions 52-1 and 52-4.

Further, this embodiment can also have the function disclosed in embodiment 5 by combining the method of forming the return portion of the resistors 52-1 through 52-4 in a round shape.

(Embodiment 8)

Figure 14:
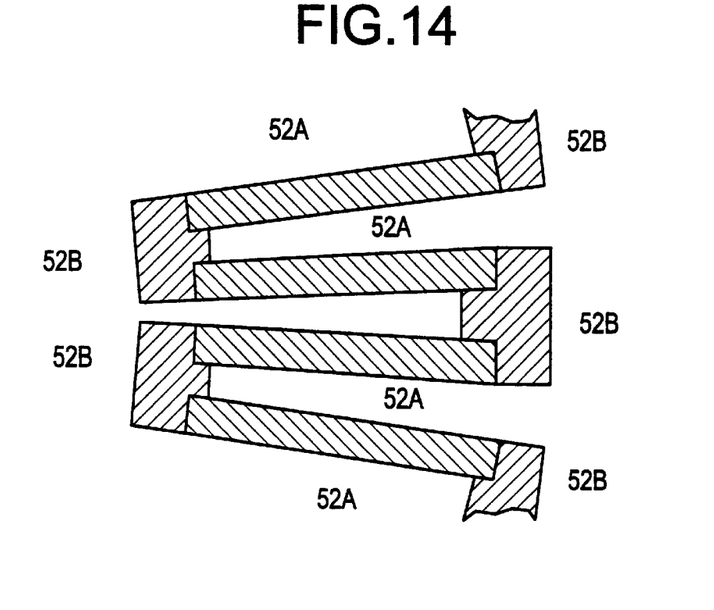
FIG. 14 is a plan view showing the structure of embodiment 8 of the pressure sensor according to the present invention.

FIG. 14 explains another embodiment of the present invention. The present embodiment solves the above-mentioned problems in yet another method. In embodiment 7, the width of the return portion 52 was widened to reduce the resistance value of said portion, but the present invention utilizes a material having small specific resistance value, for example, silver-palladium (Ag—Pd) alloy, to form the return portion 52B by screen printing, and then utilizing a material for gage resistor, for example, ruthenium tetroxide (RuO$_2$), to form the gage resistor portion 52A by screen printing.

By reducing the resistance value of the return portion 52B, even when micro crack occurs from the interior angle of the return portion toward the resistors 52, the change of the resistance value of the return portion 52B will not effect measured value, and thus the effect of the occurrence of a micro crack to the measured value will decrease.

In this method, a material having different resistance value are printed differently, and the gage resistor portion 52A should be printed after the return portion 52B has been printed.

In another example of this embodiment which brings out the same effect, the printing of the return portion 52B can be performed more times than the printing of the gage resistor portion 52A so that the thickness of the return portion 52B increases and resistance value decreases.

(Embodiment 9)

When forming an insulating body on the metallic diaphragm and further forming a strain gage on top, the resistor structuring the metal and the insulating body and the strain gage have different thermal expansion coefficient, influencing the thermal characteristics of the pressure sensor. Further, usage in the high heat region may be decided by the material of the gage or the characteristics of the insulating body.

The present embodiment solves such problem by printing the pattern of the strain gage using a ruthenium tetroxide (RuO$_2$) paste or silver-palladium (Ag—Pd) alloy paste, and then baking it to form the strain gage to be mounted on the diaphragm 2.

For example, on a ceramic diaphragm of alumina, a strain gage pattern having a line width of 0.2 mm and a thickness of 10 $\mu$m is printed using ruthenium tetroxide (RuO$_2$) paste, and then said strain gage pattern is baked for 10 minutes by 850° C. under atmospheric ambient pressure.

By this method, the printing and the baking of the strain gage could be performed by a continuing step. Therefore, the productivity is high. Further, the paste constituting the resistor body is formed of a generally used material, so a pressure sensor with low manufacturing cost could be gained.

Further, the strain gage is printed and baked on a ceramic which is an insulating body, so the voltage durability would be high. Further, the gage would be firmly bonded to the ceramic, so the stress detected at the time of the pressure sensing would be transmitted reliably to the strain gage, measuring the pressure by high accuracy, and at the same time, a stable feature could be gained even when left in a 135° C. atmosphere for more than 2000 hours in a state where stress is occurred at the diaphragm. Further, the ceramic shows the effect of an elastic body, so a pressure sensor with small variation per hour could be gained.

Even further, a sheet resistance having a wide range feature could be gained by adjusting the composition of the resistor paste, enabling correspondence to various specifications.

(Embodiment 10)

In an aim to protect the strain gage of the pressure sensor of the above embodiment from migration caused by the external environment such as oxidation and humidity, a coating utilizing epoxy-type resin and the like is provided. However, epoxy-type resin and the like, in general, do not have high heat-resistant characters. Therefore, when sealing the glass by a heat of more than 500° C. or utilizing it under high temperature, the coating may deteriorate.

The present embodiment solves such problem in a pressure sensor including an over-coating 55 formed by coating the upper surface of the strain gage 5 by a protective material such as high-temperature ceramic adhesive or high-temperature inorganic binder and the like.

Further, the present embodiment utilizes a glass having a higher melting point than the sealing glass for said protective material, and baked the protective material with a condition that differs from that recommended for said glass material, in order to reduce the strength of said over-coating glass.

Figure 15:
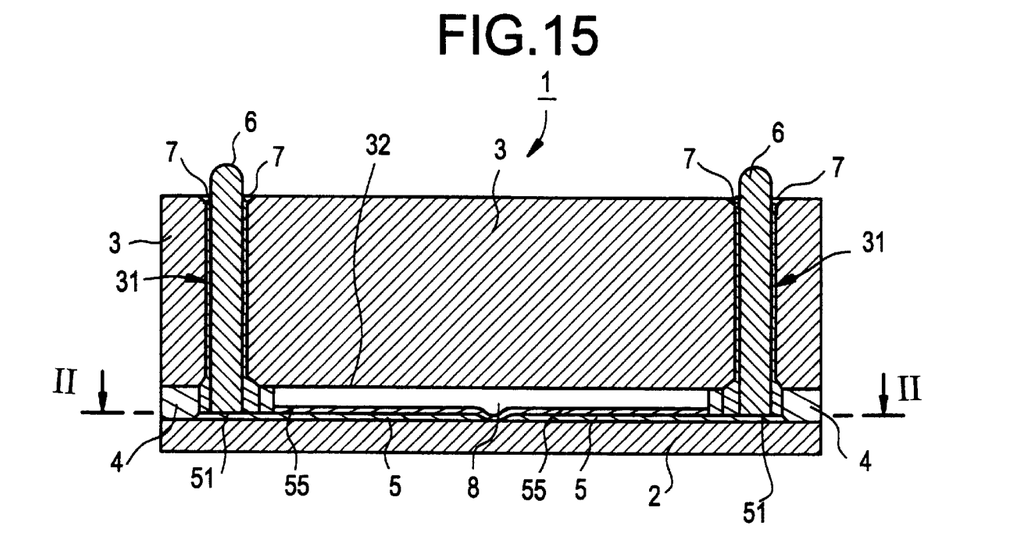
FIG. 15 is a plan view showing the structure of embodiment 10 of the pressure sensor according to the present invention.

The structure of said embodiment is shown in FIG. 15.

The strain gage-type pressure sensor 1 according to the present embodiment comprises of an insulating diaphragm 2 forming a strain gage comprising resistors 5 on said surface, an insulating substrate 3, and an adhesive 4 placed between a layer of said diaphragm 2 and a layer of said substrate 3 for adhering the layered diaphragm 2 and substrate 3.

Electrode pads 51, resistors 52-1 to 52-4 and a lead wire 53 for connecting the resistor and the electrode pad are formed on the surface of the diaphragm by screen printing and the like.

Resistors 52-1 through 52-4 are connected in a bridge to form a strain gage, and each connection point for connecting the resistors 52 are connected through a lead wire 53 to the electrode pads 51 for taking out the electric output.

The insulated diaphragm 2 is composed of a ceramic thin plate made of alumina ($Al_2O_3$), for example, formed in a circular shape having a diameter of approximately 21 mm and a thickness of 0.2–2.0 mm. A strain gage is formed on the surface of the diaphragm by a conventional method, for example, positioning a resistor 5 in a bridge state by screen printing.

On the surface of the resistors 52-1 through 52-4 are formed a covering layer 55 using a glass having higher melting point than the adhesive layer 4.

The mechanical deformation of the diaphragm occurring by the impression of stress such as pressure changes the resist value of the resistor 52 forming the strain gage, and converts to a change in electric output of the bridge.

The resistance value of the resistor structured by this printing pattern is adjusted by a trimming and the like by a laser in order to gain an output voltage proportionate to the pressure added to the diaphragm.

The diaphragm 2 and the substrate 3 are formed utilizing an insulating body such as ceramic of alumina or zirconia, a crystalline silicon or non-crystalline silicon (Si), or crystal.

The adhesive 4 utilizes a low-melting glass for example as its material, and adheres the substrate 3 and the diaphragm 2 so that a gap of about 50 $\mu$m is formed.

By covering the strain gage 5 by glass as was explained above, the strain gage weak to humidity and atmosphere gas is protected.

According to the present embodiment, the surface of the strain gage is covered by a glass having high melting point or high-temperature ceramic. Therefore, the protective material will not melt even when the sealing material is being baked at the time of assembling, and the deterioration of the coating could be prevented.

Further, the coating material has high insulating ability and mechanical strength, so a highly reliable pressure sensor could be gained.

Still further, the surface of the strain gage is covered by a protective material, so even in cases when the surrounding sealing glass has any defect, the deterioration of the strain gage could be prevented.

As is explained above, the ceramic of alumina or zirconia and silicon used in the present invention works as a perfect elastic body against stress showing characteristics such as high flexural strength, high resistance, small mechanical hysteresis and so on. Therefore, when utilized as a diaphragm of a strain gage-type pressure sensor, a pressure sensor with high accuracy and repeatability could be gained.

By determining the gap between the diaphragm 2 and the bottom surface 32 of the substrate 3 to be the best distance, a mechanical stop works when a large pressure is loaded to the diaphragm 2 and keeps the allowable stress, so a large change could be gained in the standard pressure measurement range. Also, by changing the thickness of the diaphragm, the measurement range of the pressure sensor could be from very fine pressure up to high pressure.

The clamp portion of the pressure sensor and the diaphragm on which the strain gage is formed is separated, so the output of the pressure sensor is unlikely to change caused by clamping of a large torque, or by shock from being dropped and the like.

In a capacitance-operated pressure sensor, the few micron difference of the gap between the electrodes formed on the diaphragm and the substrate determines the performance as a pressure sensor, but in the strain gage-type pressure sensor of the present invention, the difference of the gap between the diaphragm 2 and the bottom surface 32 of the substrate 32 itself will not make any difference to the output, so the diaphragm 2 and the substrate 3 could be adhered by low-melting glass and adhesive, greatly reducing the manufacturing cost.

By sealing the gap 8 between the diaphragm 2 and the substrate 3 by a low-melting glass and the like, the output error caused by the change in air pressure according to the height the pressure sensor is placed when used in a closed cycle such as a refrigeration cycle could be prevented. At the same time, a low-humidity, inert atmosphere is formed inside said gap, so the strain gage is free from dampproofing and corrosion of migration and the like caused by the contamination from the peripheral portion. Further, by adopting a sealing structure, even when the diaphragm 2 is damaged, the substrate 3 could prevent the rapid discharge of the pressure medium.

A simple structured electric circuit converting the difference in pressure to an electric output is gained having exceeded electrical characters than the capacitance-operated types.

According to embodiment 6 of the present invention, the resistors have no angle of the return portions and bend portions to form a circle so that no micro crack will occur, gaining high reliability. Further, the reduction of the distance between the resistance pattern in some areas will be prevented, improving the productivity and showing high reliability in use.

According to embodiment 7 of the present invention, by reducing the resistance value of the return portion of the resistors, even when micro crack occurs, the effect will be very little.

According to embodiment 8 of the present invention, by reducing the resistance value of the return portion 52B of the resistors, even when micro crack occurs from the interior angle of the return portion toward the resistors 52, the change of the resistance value of the return portion 52B will not effect the measured value, and thus the effect of the occurrence of a micro crack to the measured value will decrease.

According to embodiment 9 of the present invention, the printing and the baking of the strain gage could be performed by a continuing step. Therefore, the productivity is high. Further, the paste constituting the resistor body is formed of a generally used material, so a pressure sensor with low manufacturing cost could be gained.

Further, the strain gage is printed and baked on a ceramic which is an insulating body, so the voltage durability would be high. Further, the gage would be firmly bonded to the ceramic, so the stress detected at the time of the pressure sensing would be transmitted reliably to the strain gage, measuring the pressure by high accuracy, and at the same time, a stable feature could be gained with small drift characters even under repeated heat cycles. Further, the ceramic shows the effect of an elastic body, so a pressure sensor with small variation per hour could be gained.

Even further, a sheet resistance having a wide range feature could be gained by adjusting the composition of the resistor paste, enabling correspondence to various specifications.

According to embodiment 10 of the present invention, the surface of the strain gage is covered by a glass having high melting point or high-temperature ceramic. Therefore, the protective material would not melt even when the sealing material is being baked at the time of assembling, and the deterioration of the coating could be prevented.

Further, the coating material has high insulating ability and mechanical strength, so a highly reliable pressure sensor could be gained.

Still further, the surface of the strain gage is covered by a protective material, so even in cases when the surrounding sealing glass has any defect, the deterioration of the strain gage could be prevented.

We claim:

1. A pressure sensor comprising:
an insulating diaphragm having a strain gage mounted on a surface thereof; and
a substrate positioned opposing the surface of said diaphragm on which the strain gage is mounted, said substrate positioned so as to maintain a gap between said surface of the diaphragm on which the strain gage is mounted and said substrate; wherein
said gap is predetermined such that the substrate limits deformation of said diaphragm; and
an insulating body formed of at least one of ceramic, silicon and crystal is used as the diaphragm.

2. The pressure sensor of claim 1 wherein said substrate is formed of the same material as said diaphragm.

3. The pressure sensor of claim 1 wherein said diaphragm and said substrate are fixed using a fixing medium.

4. The pressure sensor of claim 1 wherein:
said substrate is formed of the same material as said diaphragm; and
said diaphragm and said substrate are fixed using a fixing medium.

5. The pressure sensor of claim 1 wherein:
said diaphragm and said substrate are fixed using a fixing medium; and
said fixing medium includes an adhesive comprising at least one of a low-melting glass and a thermosetting resin.

6. The pressure sensor of claim 1 wherein:
said substrate is formed of the same material as said diaphragm;
said diaphragm and said substrate are fixed using a fixing medium; and
said fixing medium includes an adhesive comprising at least one of a low-melting glass and a thermosetting resin.

7. The pressure sensor of claim 1 wherein:
said diaphragm and said substrate are fixed using a fixing medium;
said fixing medium includes an adhesive comprising at least one of a low-melting glass and a thermosetting resin; and
a gap forming member having a predetermined diameter is included in said adhesive.

8. The pressure sensor of claim 1 wherein:
said substrate is formed of the same material as said diaphragm;
said diaphragm and said substrate are fixed using a fixing medium;
said fixing medium includes an adhesive comprising at least one of a low-melting glass and a thermosetting resin; and
a gap forming member having a predetermined diameter is included in said adhesive.

9. The pressure sensor of claim 1 wherein said gap is formed by forming a concave on the surface of said substrate opposing said diaphragm.

10. The pressure sensor of claim 1 wherein:
said substrate is formed of the same material as said diaphragm; and
said gap is formed by forming a concave on the surface of said substrate opposing said diaphragm.

11. The pressure sensor of claim 1 wherein:
said diaphragm and said substrate are fixed using a fixing medium; and
said gap is formed by forming a concave on the surface of said substrate opposing said diaphragm.

12. The pressure sensor of claim 1 wherein:
said substrate is formed of the same material as said diaphragm;
said diaphragm and said substrate are fixed using a fixing medium; and
said gap is formed by forming a concave on the surface of said substrate opposing said diaphragm.

13. The pressure sensor of claim 1 wherein:
said diaphragm and said substrate are fixed using a fixing medium;
said fixing medium includes an adhesive comprising at least one of a low-melting glass and a thermosetting resin; and
said gap is formed by forming a concave on the surface of said substrate opposing said diaphragm.

14. The pressure sensor of claim 1 wherein:
said substrate is formed of the same material as said diaphragm;
said diaphragm and said substrate are fixed using a fixing medium;
said fixing medium includes an adhesive comprising at least one of a low-melting glass and a thermosetting resin; and said gap is formed by forming a concave on the surface of said substrate opposing said diaphragm.

15. A pressure sensor comprising:

an insulating diaphragm having a strain gage mounted on a surface thereof; and a substrate positioned opposing the surface of said diaphragm on which the strain gage is mounted, said substrate positioned so as to maintain a gap between said surface of the diaphragm on which the strain gage is mounted and said substrate; wherein said gap is predetermined such that the substrate limits deformation of said diaphragm; and an electric circuit wiring pattern is formed on the surface of said substrate.

16. A pressure sensor comprising:

an insulating diaphragm having a strain gage mounted on a surface thereof; and a substrate positioned opposing the surface of said diaphragm on which the strain gage is mounted, said substrate positioned so as to maintain a gap between said surface of the diaphragm on which the strain gage is mounted and said substrate; wherein said gap is predetermined such that the substrate limits deformation of said diaphragm; and a circuit board having an electric circuit wiring pattern is adhered to the surface of said substrate.

17. A pressure sensor comprising:

an insulating diaphragm having a strain gage mounted on a surface thereof; and a substrate positioned opposing the surface of said diaphragm on which the strain gage is mounted, said substrate positioned so as to maintain a gap between said surface of the diaphragm on which the strain gage is mounted and said substrate; wherein an electric circuit is placed on the surface of said substrate, and said pressure sensor is fixed inside a container through an elastic member.

18. A pressure sensor comprising:

an insulating diaphragm having a strain gage mounted on a surface thereof; and a substrate positioned opposing the surface of said diaphragm on which the strain gage is mounted, said substrate positioned so as to maintain a gap between said surface of the diaphragm on which the strain gage is mounted and said substrate; wherein an insulating body formed of at least one of ceramic, silicon and crystal is used as the diaphragm; and a return portion of a resistor for the strain gage formed on said substrate has no angle.

19. A pressure sensor comprising:

an insulating diaphragm having a strain gage mounted on a surface thereof; and a substrate positioned opposing the surface of said diaphragm on which the strain gage is mounted, said substrate positioned so as to maintain a gap between said surface of the diaphragm on which the strain gage is mounted and said substrate; wherein an insulating body formed of at least one of ceramic, silicon and crystal is used as the diaphragm; and the resistance value of a return portion of a resistor for the strain gage formed on said diaphragm is reduced relative to another portion of the resistor.

20. The pressure sensor of claim 19 wherein the resistance value of the return portion of the resistor for the strain gage formed on said substrate is reduced by forming the return portion by a low resistance material.

21. The pressure sensor of claim 19 wherein the resistance value of the return portion of the resistor for the strain gage formed on said diaphragm is reduced by widening the width of said return portion.

22. A pressure sensor comprising:

an insulating diaphragm having a strain gage mounted on a surface thereof; and a substrate positioned opposing the surface of said diaphragm on which the strain gage is mounted, said substrate positioned so as to maintain a gap between said surface of the diaphragm on which the strain gage is mounted and said substrate; wherein an insulating body formed of at least one of ceramic, silicon and crystal is used as the diaphragm; and a resistor for the strain gage mounted on said diaphragm is formed by printing.

23. The pressure sensor of claim 22 wherein at least one of a silver-palladium alloy paste material and a ruthenium tetroxide paste material is printed and baked to form said resistor.

24. A pressure sensor comprising:

an insulating diaphragm having a strain gage mounted on a surface thereof; and a substrate positioned opposing the surface of said diaphragm on which the strain gage is mounted, said substrate positioned so as to maintain a gap between said surface of the diaphragm on which the strain gage is mounted and said substrate; wherein said gap is predetermined such that the substrate limits deformation of said diaphragm; and an insulating body formed of at least one of ceramic, silicon and crystal is used as the diaphragm; and a surface of a resistor for the strain gage mounted on said diaphragm is covered with a protective material.

25. The pressure sensor of claim 24 wherein a glass having higher melting point than the baking temperature of a sealing member is utilized as said protective material.

26. The pressure sensor of claim 1 wherein the ceramic of the insulating body is at least one of alumina and zirconia.

27. The pressure sensor of claim 1 wherein the surface of said substrate opposing the diaphragm is formed of an insulator disposed on metal.

28. The pressure sensor of claim 1 wherein:

the surface of said substrate opposing the diaphragm is formed of an insulator disposed on metal; and said diaphragm and said substrate are fixed using a fixing medium.

29. The pressure sensor of claim 1 wherein:

the surface of said substrate opposing the diaphragm is formed of an insulator disposed on metal;

said diaphragm and said substrate are fixed using a fixing medium; and said fixing medium includes at least one of an adhesive comprising a low-melting glass and a thermosetting resin.

30. The pressure sensor of claim 1 wherein:

the surface of said substrate opposing the diaphragm is formed of an insulator disposed on metal;

said diaphragm and said substrate are fixed using a fixing medium;

said fixing medium includes at least one of an adhesive comprising a low-melting glass and a thermosetting resin; and a gap forming member having a predetermined diameter is included in said adhesive.

31. The pressure sensor of claim 1 wherein:

the surface of said substrate opposing the diaphragm is formed of an insulator disposed on metal; and said gap is formed by forming a concave on the surface of said substrate opposing said diaphragm.

32. The pressure sensor of claim 1 wherein:

the surface of said substrate opposing the diaphragm is formed of an insulator disposed on metal;

said diaphragm and said substrate are fixed using a fixing medium; and said gap is formed by forming a concave on the surface of said substrate opposing said diaphragm.

33. The pressure sensor of claim 1 wherein:

the surface of said substrate opposing the diaphragm is formed of an insulator disposed on metal;

said diaphragm and said substrate are fixed using a fixing medium;

said fixing medium includes at least one of an adhesive comprising a low-melting glass and a thermosetting resin; and said gap is formed by forming a concave on the surface of said substrate opposing said diaphragm.

* * * * *